US012670038B2

(12) United States Patent (10) Patent No.: US 12,670,038 B2
Zhang et al. (45) Date of Patent: Jun. 30, 2026

(54) RISK MITIGATION ARCHITECTURE FOR APPLICATION PROGRAMMING INTERFACE SERVICE ADOPTION

(71) Applicant: Express Scripts Strategic Development, Inc., St. Louis, MO (US)

(72) Inventors: Li Zhang, Chesterfield, MO (US); Steven DeLassus, O'Fallon, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 507 days.

(21) Appl. No.: 18/233,401

(22) Filed: Aug. 14, 2023

(65) Prior Publication Data

US 2025/0061008 A1 Feb. 20, 2025

(51) Int. Cl.
*G06F 9/54* (2006.01)
(52) U.S. Cl.
CPC .................................... *G06F 9/541* (2013.01)
(58) Field of Classification Search
None
See application file for complete search history.

(56) References Cited

U.S. PATENT DOCUMENTS

| | | | |
|---|---|---|---|
| 8,326,963 B2 | 12/2012 | Moussallam | |
| 9,307,031 B2 | 4/2016 | Santhanam | |
| 9,569,177 B2 | 2/2017 | Kaulgud | |
| 9,830,448 B2 | 11/2017 | Holt | |
| 10,169,222 B2 | 1/2019 | Chappalgaon | |
| 10,185,546 B2 | 1/2019 | Kaulgud | |
| 10,289,767 B2 | 5/2019 | Whitehead | |
| 10,740,121 B2 | 8/2020 | Jann | |
| 10,841,336 B2 | 11/2020 | Cahana | |
| 11,917,013 B1 * | 2/2024 | Han | H04L 12/66 |
| 12,333,299 B2 * | 6/2025 | Conn | G06F 8/71 |
| 2002/0144018 A1 * | 10/2002 | Knutson | G06F 8/76 |
| | | | 719/328 |

(Continued)

FOREIGN PATENT DOCUMENTS

JP         2023540150 A  *  9/2023  .......... G06F 11/3698

OTHER PUBLICATIONS

Sabzevari, A. (Nov. 3, 2021). Parallel Run Pattern—a migration technique in microservices architecture. Zalando Engineering Blog. https://engineering.zalando.com (Year: 2021).*

*Primary Examiner* — S. Sough
*Assistant Examiner* — Selena Sabah Nahra
(74) *Attorney, Agent, or Firm* — Harness IP

(57) ABSTRACT

A risk mitigation architecture for new application programming interface service adoption includes a client interface configured to generate an API call, a legacy API module configured to generate a legacy API result in response to receiving the API call, a new API module configured to generate a new API result in response to receiving the API call, and a delegation module configured to selectively return the legacy API result to the client interface or the new API result to the client interface, according to at least one specified feature selector. The architecture includes a data comparator in communication with the delegation module, the data comparator configured to compare the legacy API result with the new API result according to at least one specified comparison configuration, to generate an API comparison result indicative of the legacy API result and the new API result having same or different output data.

20 Claims, 17 Drawing Sheets

(56) References Cited

U.S. PATENT DOCUMENTS

| | | |
|---|---|---|
| 2014/0278724 A1 | 9/2014 | Compagna |
| 2015/0143355 A1* | 5/2015 | Tingstrom .............. H04L 67/10 |
| | | 717/170 |
| 2023/0101447 A1* | 3/2023 | Bispo ........................ G06F 8/36 |
| | | 719/311 |
| 2024/0256367 A1* | 8/2024 | Hua ........................ G06F 9/543 |

* cited by examiner

RISK MITIGATION ARCHITECTURE FOR APPLICATION PROGRAMMING INTERFACE SERVICE ADOPTION

FIELD

The present disclosure relates to risk mitigation architecture for application programming interface service adoption.

BACKGROUND

Modern web and mobile applications rely heavily on service application programming interfaces (APIs) to provide requested data. Large service API systems have multiple layers of service APIs, from frontend services to middleware services to backend services. Service APIs undergo constant transformations due to technology improvements on architecture, programming languages/frameworks, cloud infrastructure, communications/networking, databases, etc. The new APIs need to be fully tested before the consuming services can adopt the new APIs.

However, newly transformed APIs may not be fully tested in non-production environments due to test data limitations. In order to fully test new APIs, the testing requires that the consuming service adopt the new API in production to use more complete data coverage, but the consuming applications will have risks in adopting the new APIs in production before they are fully validated.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A risk mitigation architecture for new application programming interface service adoption includes a client interface configured to generate an application programming interface (API) call, a legacy API module configured to generate a legacy API result in response to receiving the API call, a new API module configured to generate a new API result in response to receiving the API call, and a delegation module in communication between the client interface, the legacy API module and the new API module. The delegation module is configured to selectively return the legacy API result to the client interface or the new API result to the client interface, according to at least one specified feature selector. The architecture includes a data comparator in communication with the delegation module, the data comparator configured to compare the legacy API result with the new API result according to at least one specified comparison configuration, to generate an API comparison result indicative of the legacy API result and the new API result having same output data or different output data.

In other features, the architecture includes a legacy API adapter class in communication between the delegation module and the legacy API module, the legacy API adapter class configured to wrap a backend API and data model of the legacy API module to expose a common API to the delegation module for the legacy API module, and a new API adapter class in communication between the delegation module and the new API module, the new API adapter class configured to wrap a backend API and data model of the new API module to expose a common API to the delegation module for the new API module.

In other features, the at least one specified feature selector includes a first feature selector, and a second feature selector, and the delegation module is configured to selectively transmit a first feature selector percentage of legacy API results and new API results to the data comparator in order to compare legacy API results and new API results. In other features, the delegation module is configured to select a second feature selector percentage of new API results to return to the client interface instead of the legacy API results.

In other features, the delegation module is configured to use a second feature selector percentage of zero as an initial setting, and the delegation module is configured to increase the second feature selector percentage subsequent to the initial setting of zero. In other features, the delegation module is configured to use a first feature selector percentage of zero as an initial setting, and the delegation module is configured to increase the first feature selector percentage subsequent to the initial setting of zero.

In other features, the specified comparison configuration includes at least one of an exception data comparison between the legacy API result with the new API result, a primitive data comparison between the legacy API result with the new API result, a string data comparison between the legacy API result with the new API result, a map data comparison between the legacy API result with the new API result, a list data comparison between the legacy API result with the new API result, and a field data comparison between the legacy API result with the new API result.

In other features, the data comparator is configured to call an exception comparator function in response to a determination that an object of the legacy API result or the new API result includes an exception. In other features, the data comparator is configured to obtain class information of at least one object of the legacy API result or the new API result, call a primitive comparator function in response to a determination that a class of the legacy API result or the new API result is a primitive, and call a string comparator function in response to a determination that a class of the legacy API result or the new API result is a string.

In other features, the data comparator is configured to perform a field by field comparison of fields of the legacy API result and the new API result, call a map comparator function in response to a determination that a class of the legacy API result or the new API result is a map, and call a list comparator function in response to a determination that a class of the legacy API result or the new API result is a list. In other features, the data comparator is configured to compare object keys of the legacy API result and the new API result, and call a field comparator function in response to a result of the comparison of the object keys.

A method of risk mitigation for new application programming interface service adoption includes generating, by a client interface, an application programming interface (API) call, generating, by a legacy API module, a legacy API result in response to receiving the API call, generating, by a new API module, a new API result in response to receiving the API call, selectively returning, by a delegation module, the legacy API result to the client interface or the new API result to the client interface, according to at least one specified feature selector, the delegation module in communication between the client interface, the legacy API module and the new API module, and comparing, by a data comparator, the legacy API result with the new API result according to at least one specified comparison configuration, to generate an API comparison result indicative of the legacy API result and the new API result having same output data or different output data, the data comparator in communication with the delegation module.

In other features, the method includes wrapping, by a legacy API adapter class, a backend API and data model of the legacy API module to expose a common API to the delegation module for the legacy API module, the legacy API adapter class in communication between the delegation module and the legacy API module, and wrapping, by a new API adapter class, a backend API and data model of the new API module to expose a common API to the delegation module for the new API module, the new API adapter class in communication between the delegation module and the new API module.

In other features, the at least one specified feature selector includes a first feature selector, and a second feature selector, and the method further comprises selectively transmitting, by the delegation module, a first feature selector percentage of legacy API results and new API results to the data comparator in order to compare legacy API results and new API results. In other features, the method includes selecting, by the delegation module, a second feature selector percentage of new API results to return to the client interface instead of the legacy API results.

In other features, the specified comparison configuration includes at least one of an exception data comparison between the legacy API result with the new API result, a primitive data comparison between the legacy API result with the new API result, a string data comparison between the legacy API result with the new API result, a map data comparison between the legacy API result with the new API result, a list data comparison between the legacy API result with the new API result, and a field data comparison between the legacy API result with the new API result.

In other features, the method includes calling, by the data comparator, an exception comparator function in response to a determination that an object of the legacy API result or the new API result includes an exception. In other features, the method includes obtaining class information of at least one object of the legacy API result or the new API result, calling a primitive comparator function in response to a determination that a class of the legacy API result or the new API result is a primitive, and calling a string comparator function in response to a determination that a class of the legacy API result or the new API result is a string.

In other features, the method includes performing a field by field comparison of fields of the legacy API result and the new API result, calling a map comparator function in response to a determination that a class of the legacy API result or the new API result is a map, and calling a list comparator function in response to a determination that a class of the legacy API result or the new API result is a list. In other features, the method includes comparing object keys of the legacy API result and the new API result, and calling a field comparator function in response to a result of the comparison of the object keys.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

4

Figure 1:
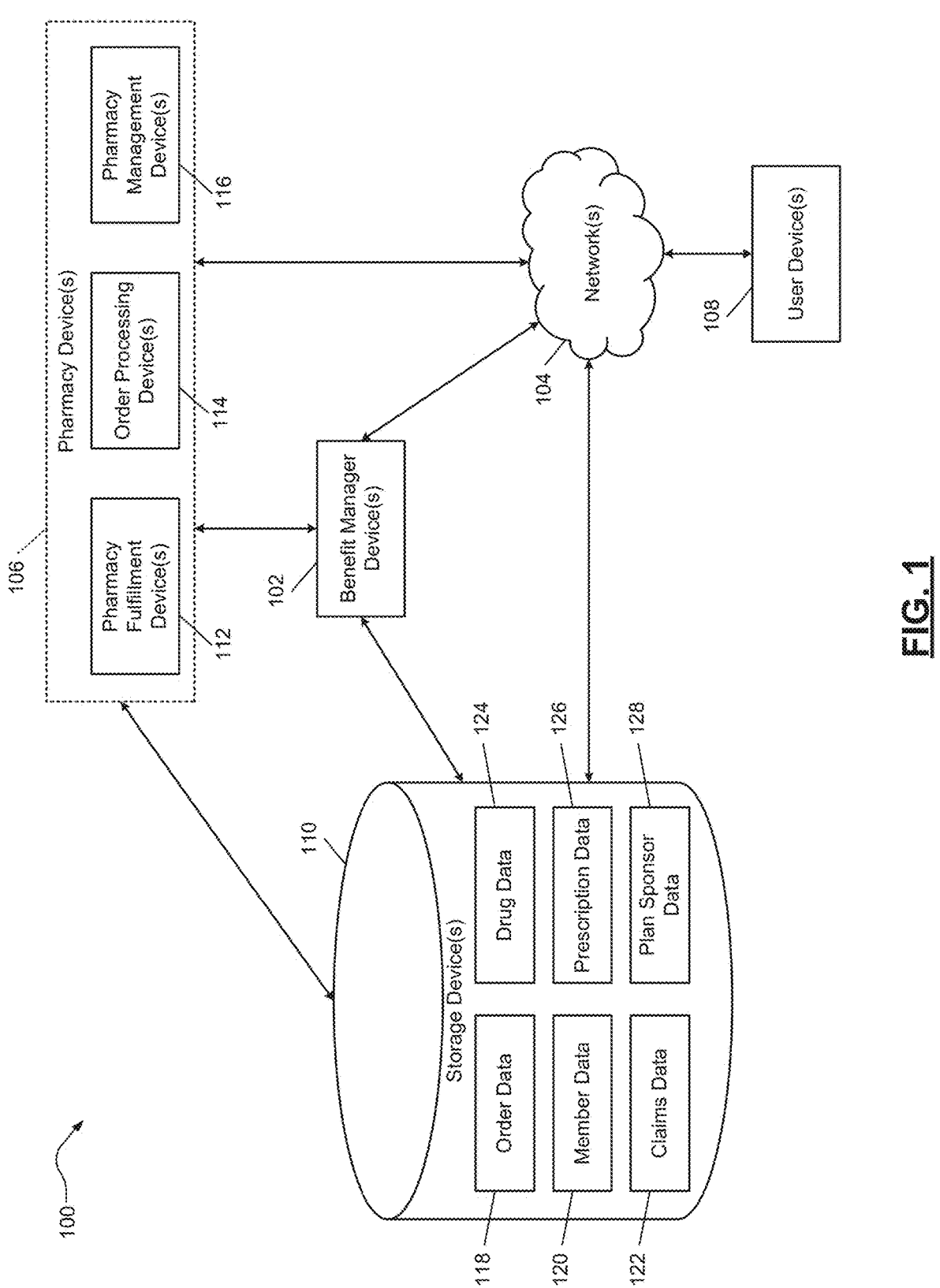

FIG. 1 is a functional block diagram of an example system including a high-volume pharmacy.

Figure 2:
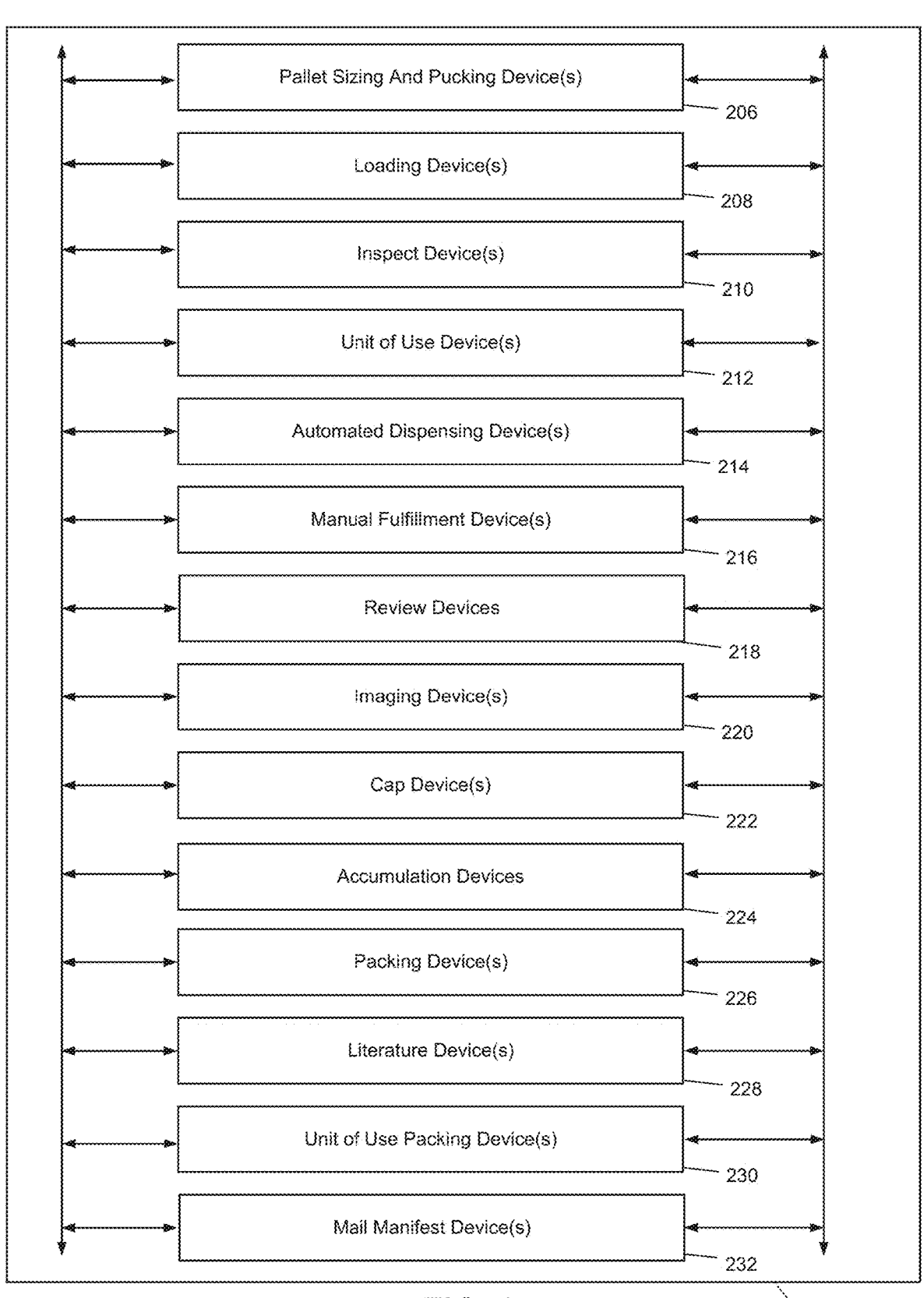

FIG. 2 is a functional block diagram of an example pharmacy fulfillment device, which may be deployed within the system of FIG. 1.

Figure 3:
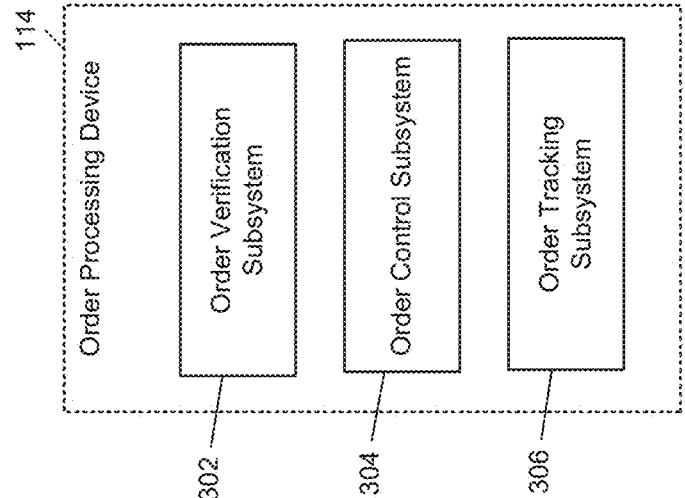
Figure 3:

FIG. 3 is a functional block diagram of an example order processing device, which may be deployed within the system of FIG. 1.

Figure 4:
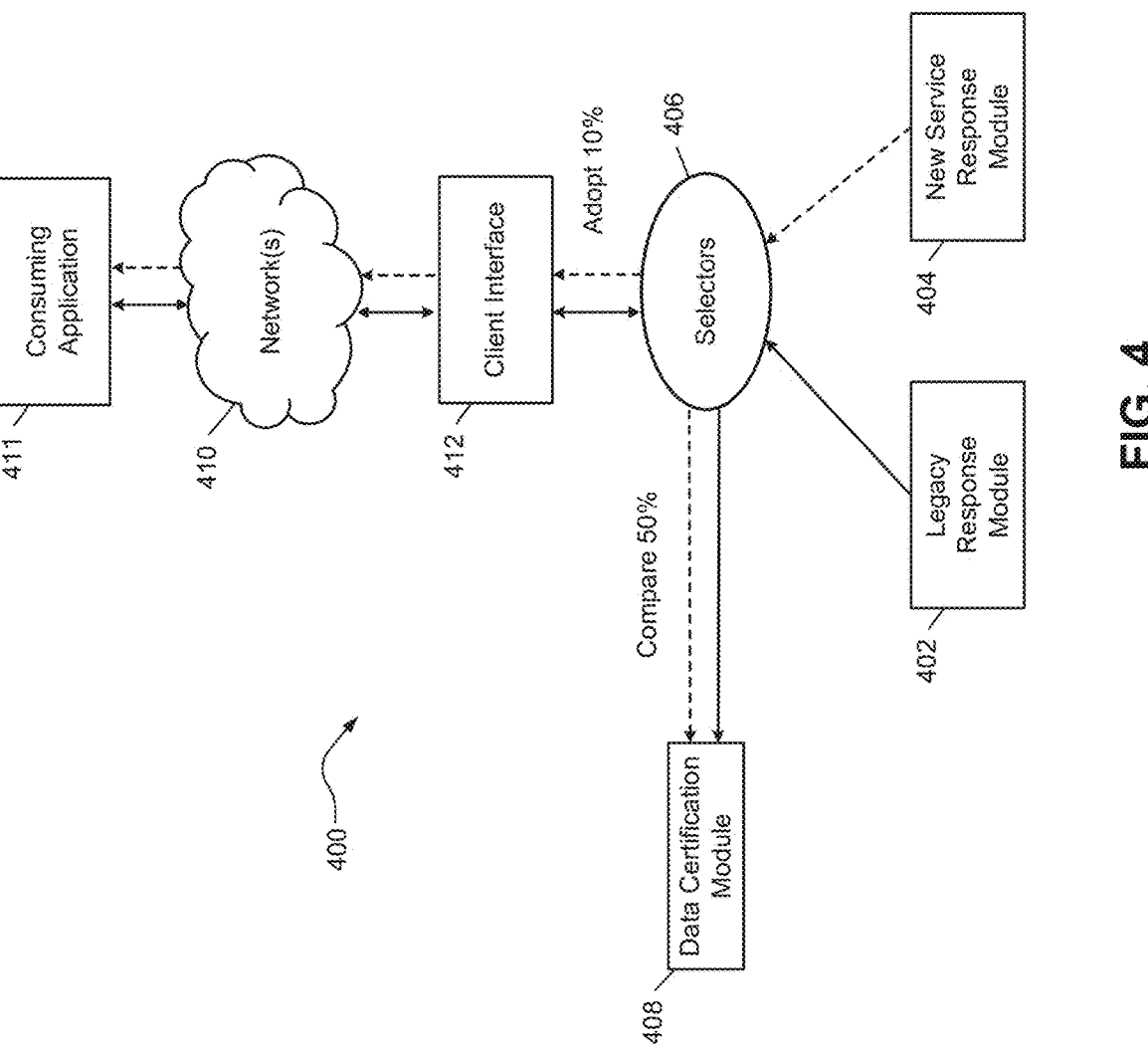

FIG. 4 is a functional block diagram of an example system for new application programming interface service adoption.

Figure 5:
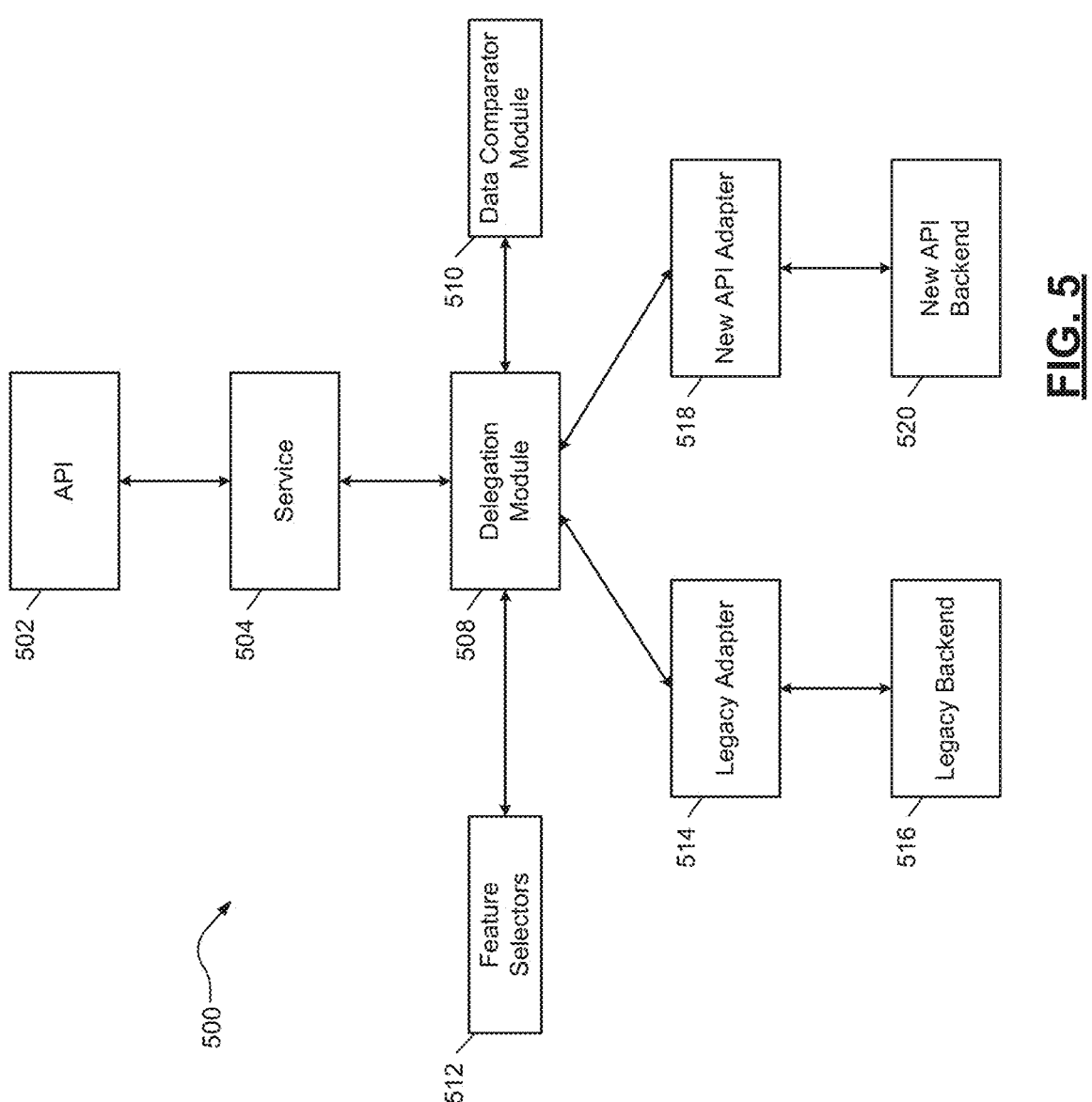

FIG. 5 is a functional block diagram of an example risk mitigation architecture for new application programming interface service adoption.

Figure 6:
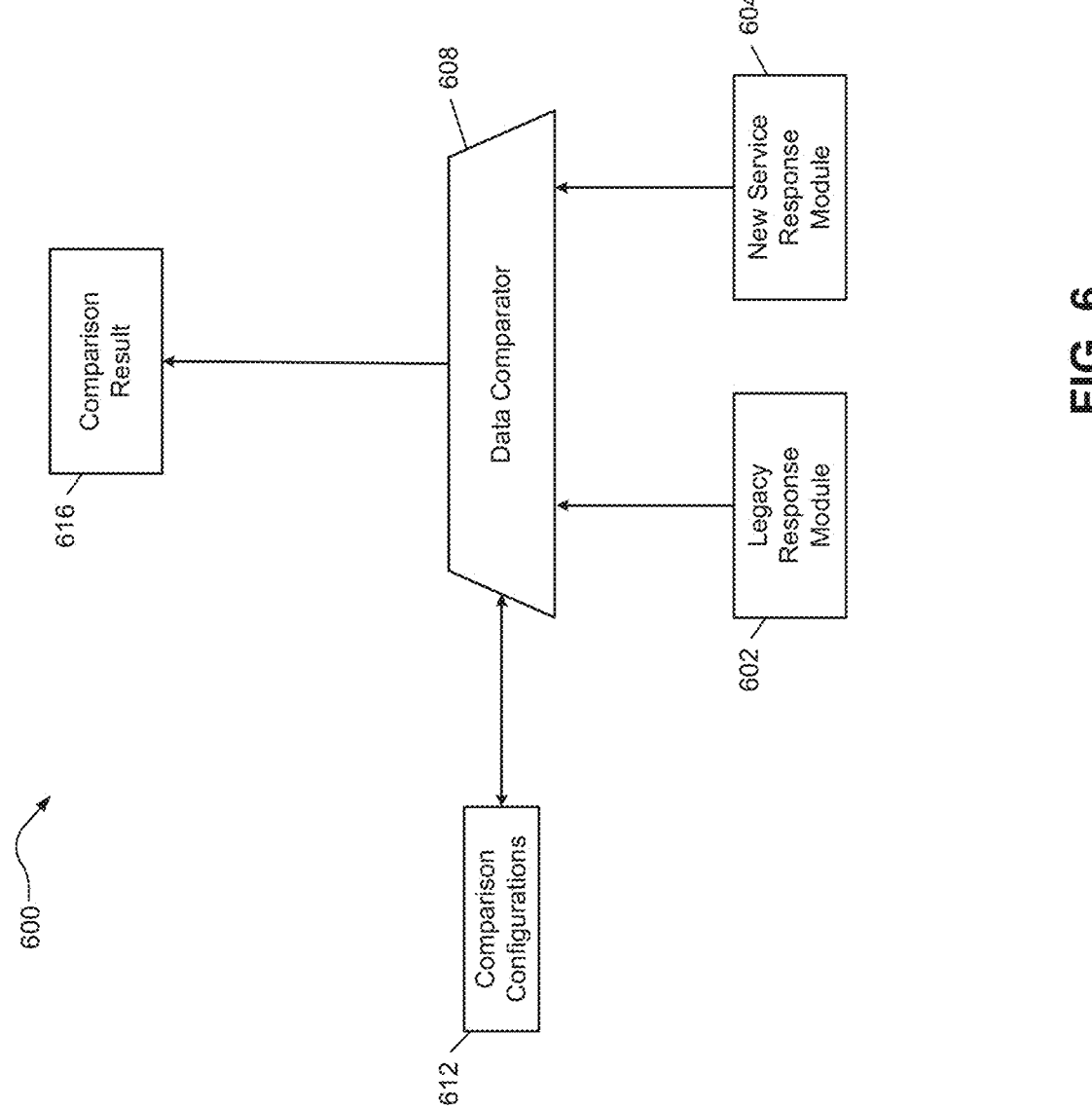

FIG. 6 is a functional block diagram of an example data comparator in a risk mitigation architecture for new application programming interface service adoption.

Figure 7A:
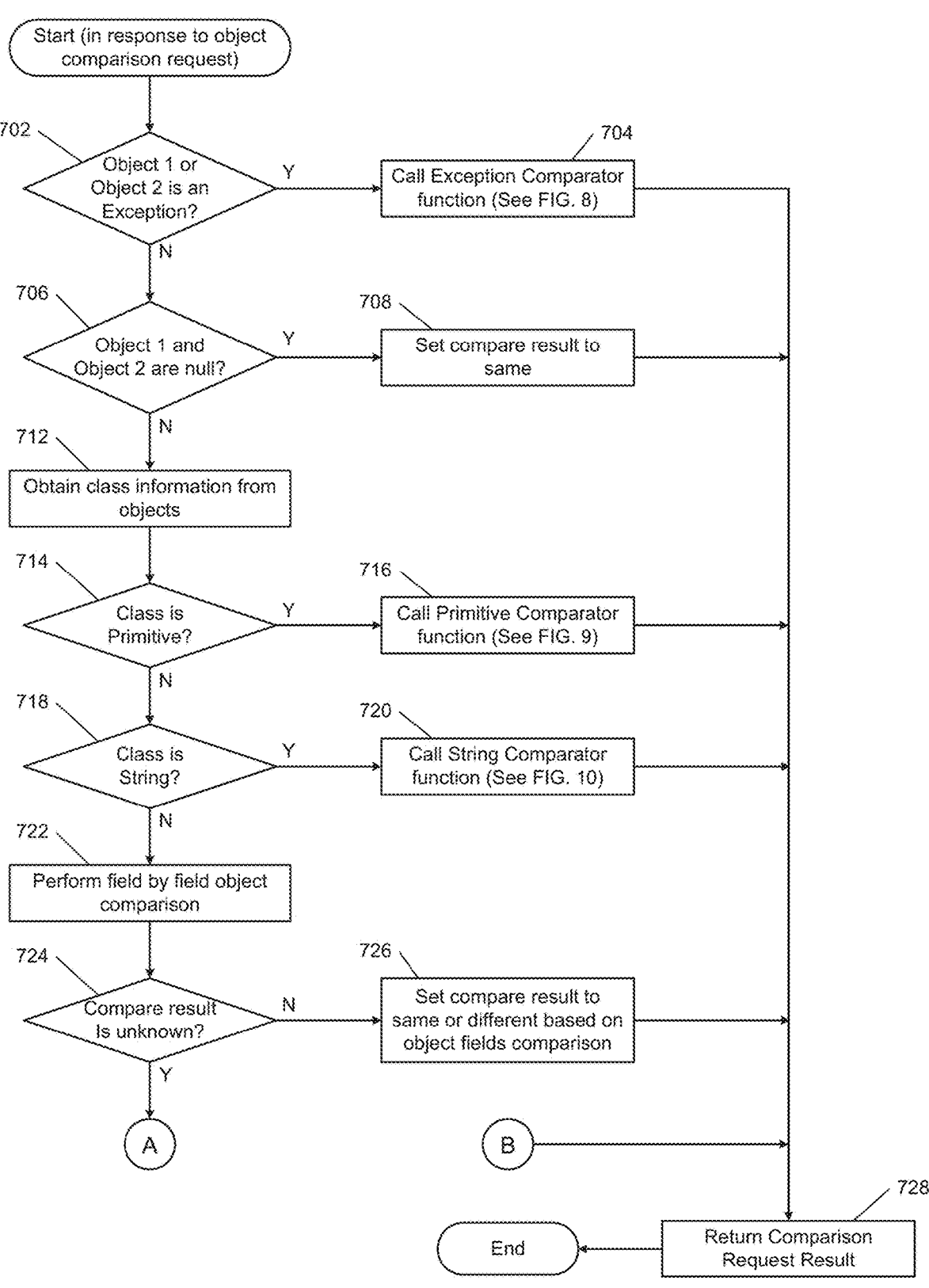
Figure 7B:
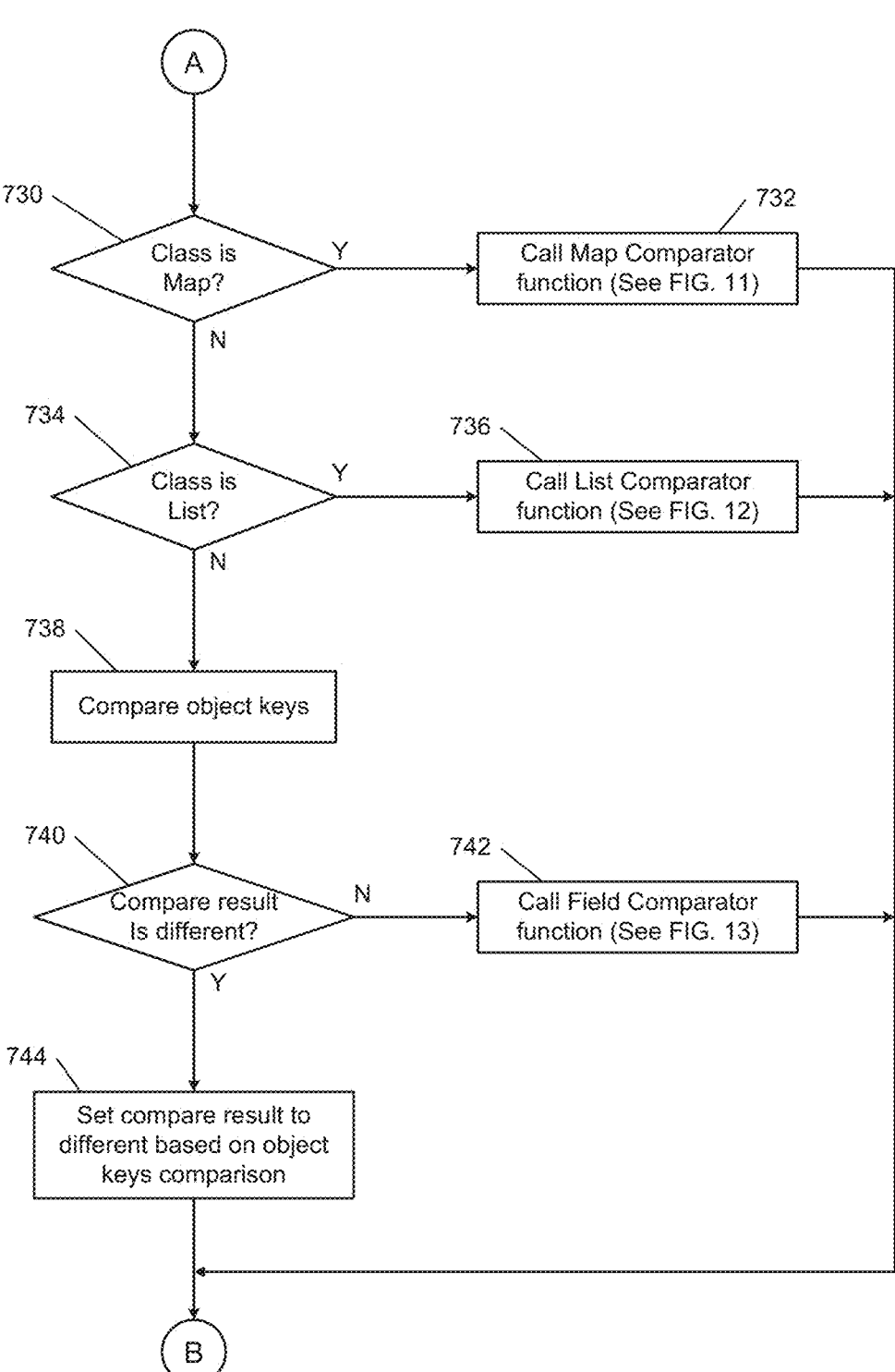

FIGS. 7A and 7B are a flowchart depicting example top level data comparison logic.

Figure 8:
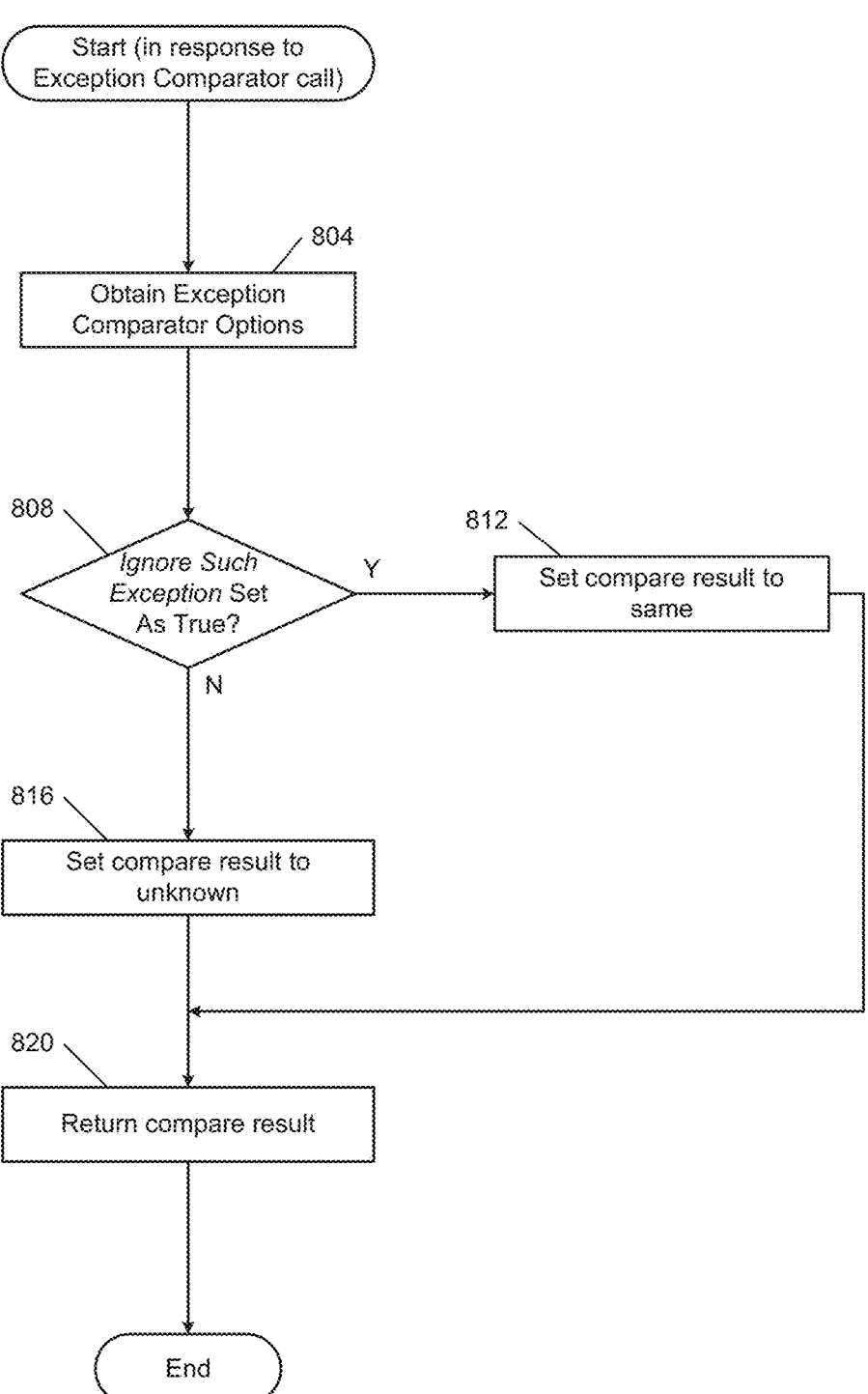

FIG. 8 is a flowchart depicting an example process for executing an exception comparison in the process of FIGS. 7A and 7B.

Figure 9:
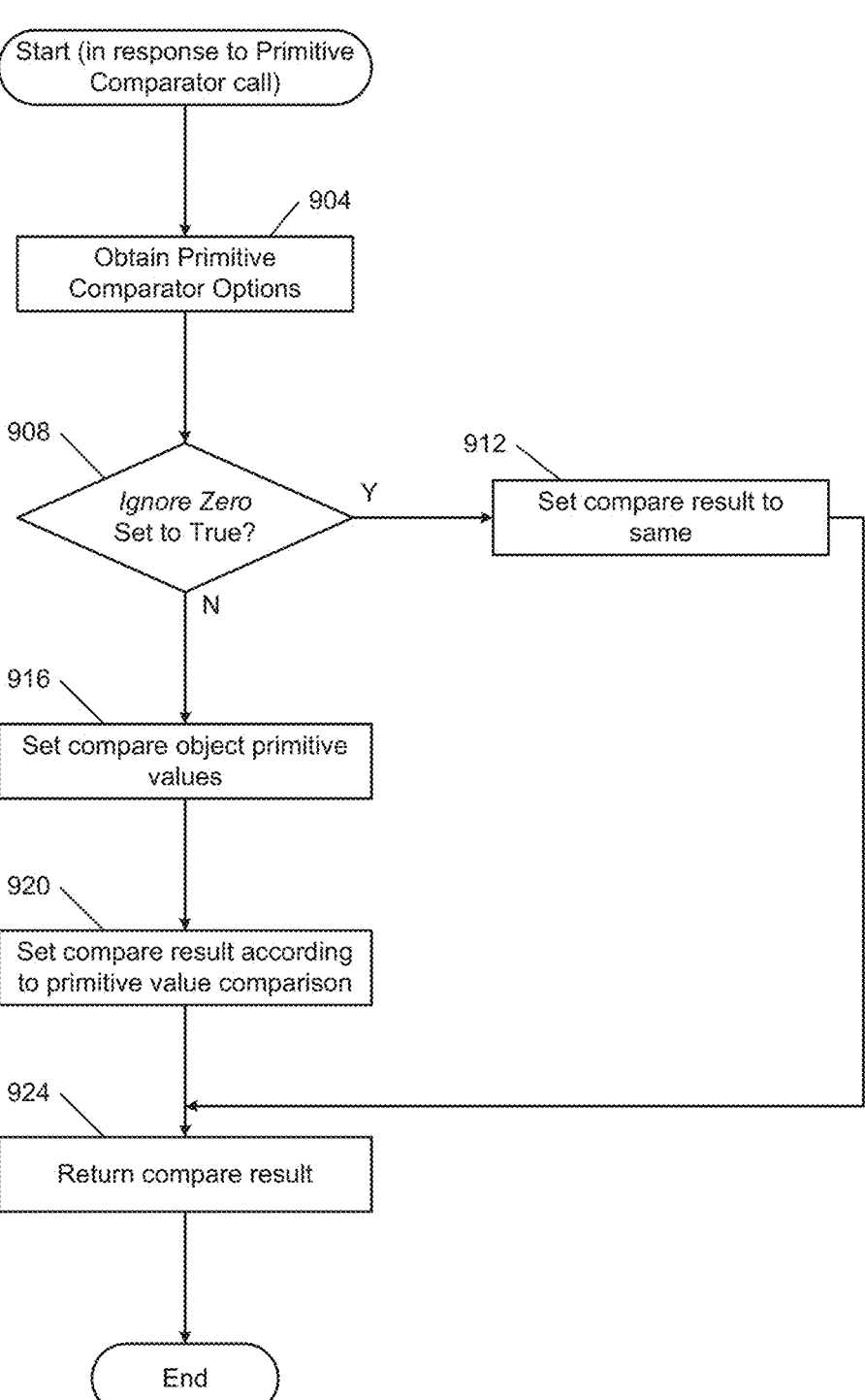

FIG. 9 is a flowchart depicting an example process for executing a primitive comparison in the process of FIGS. 7A and 7B.

Figure 10:
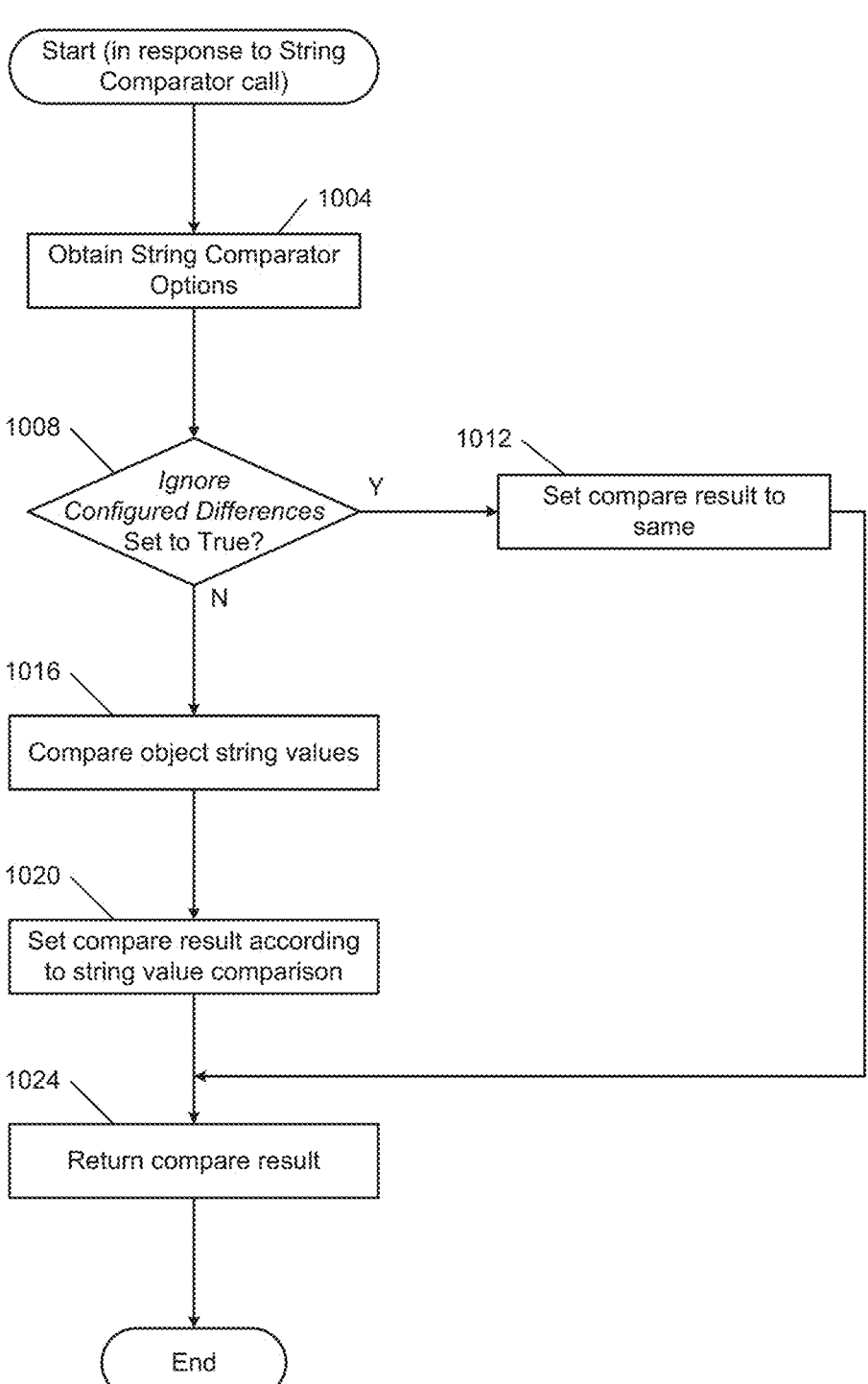

FIG. 10 is a flowchart depicting an example process for executing a string comparison in the process of FIGS. 7A and 7B.

Figure 11:
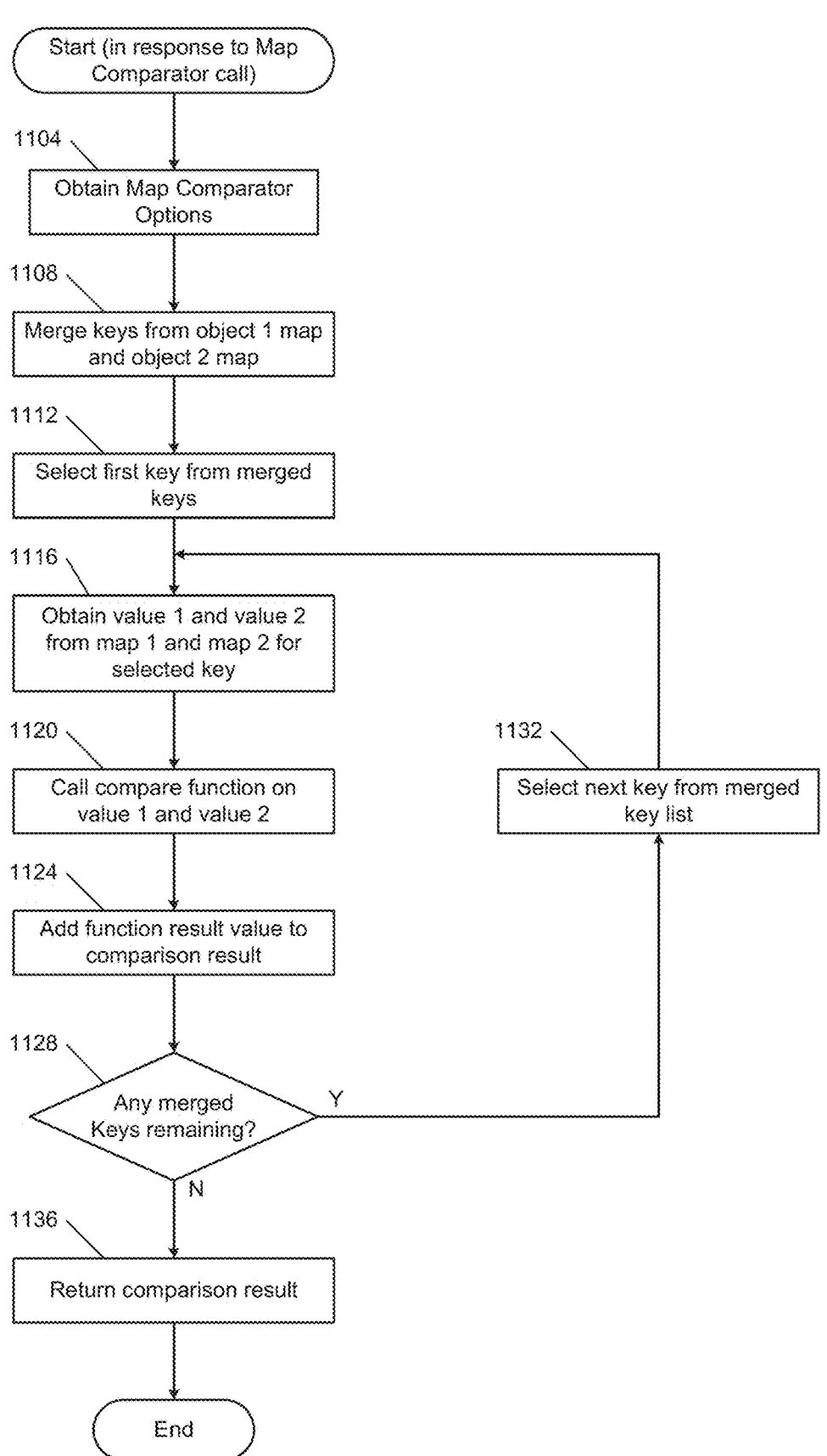

FIG. 11 is a flowchart depicting an example process for executing a map comparison in the process of FIGS. 7A and 7B.

Figure 12A:
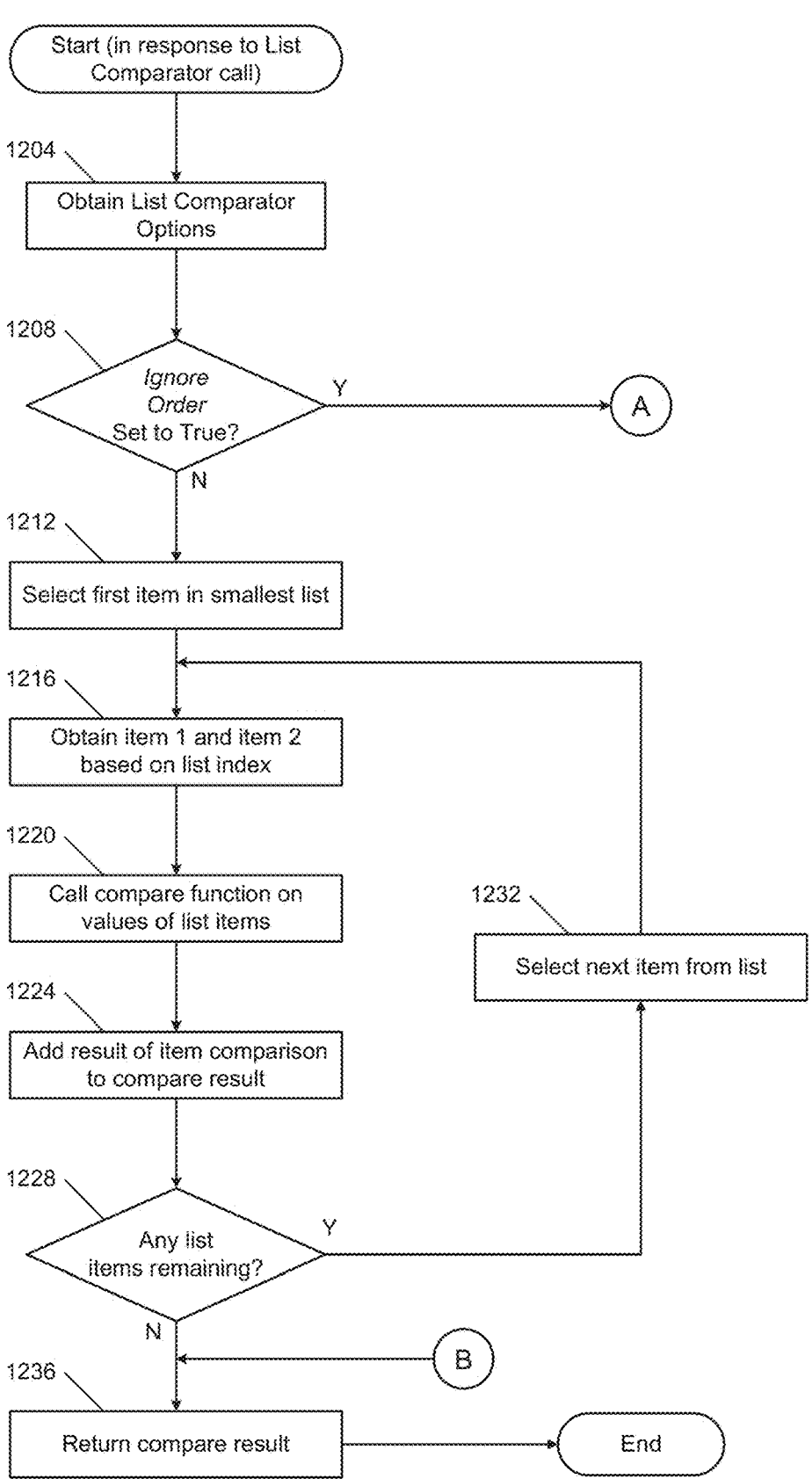
Figure 12B:
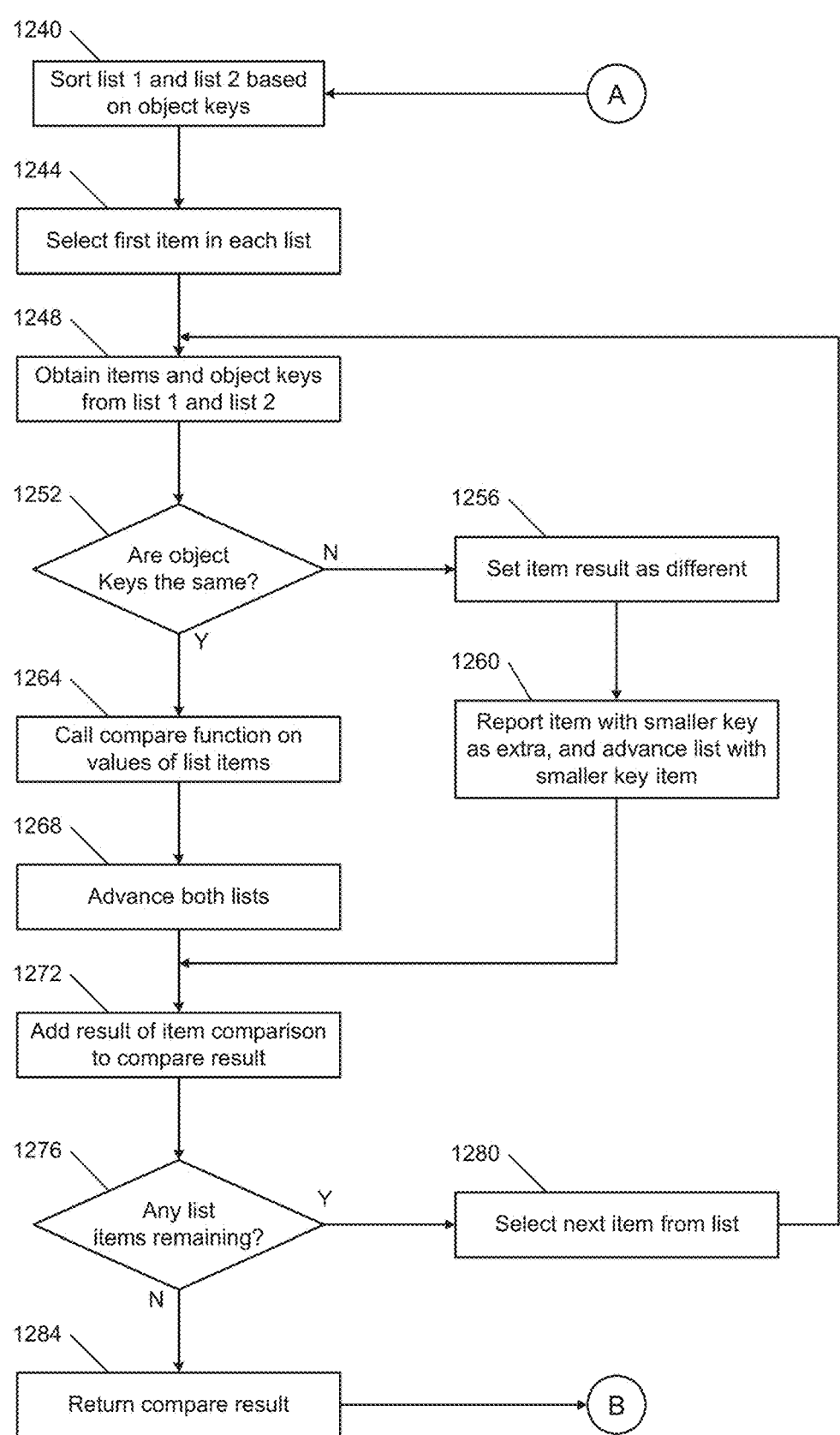

FIGS. 12A and 12B are a flowchart depicting an example process for executing a list comparison in the process of FIGS. 7A and 7B.

Figure 13:
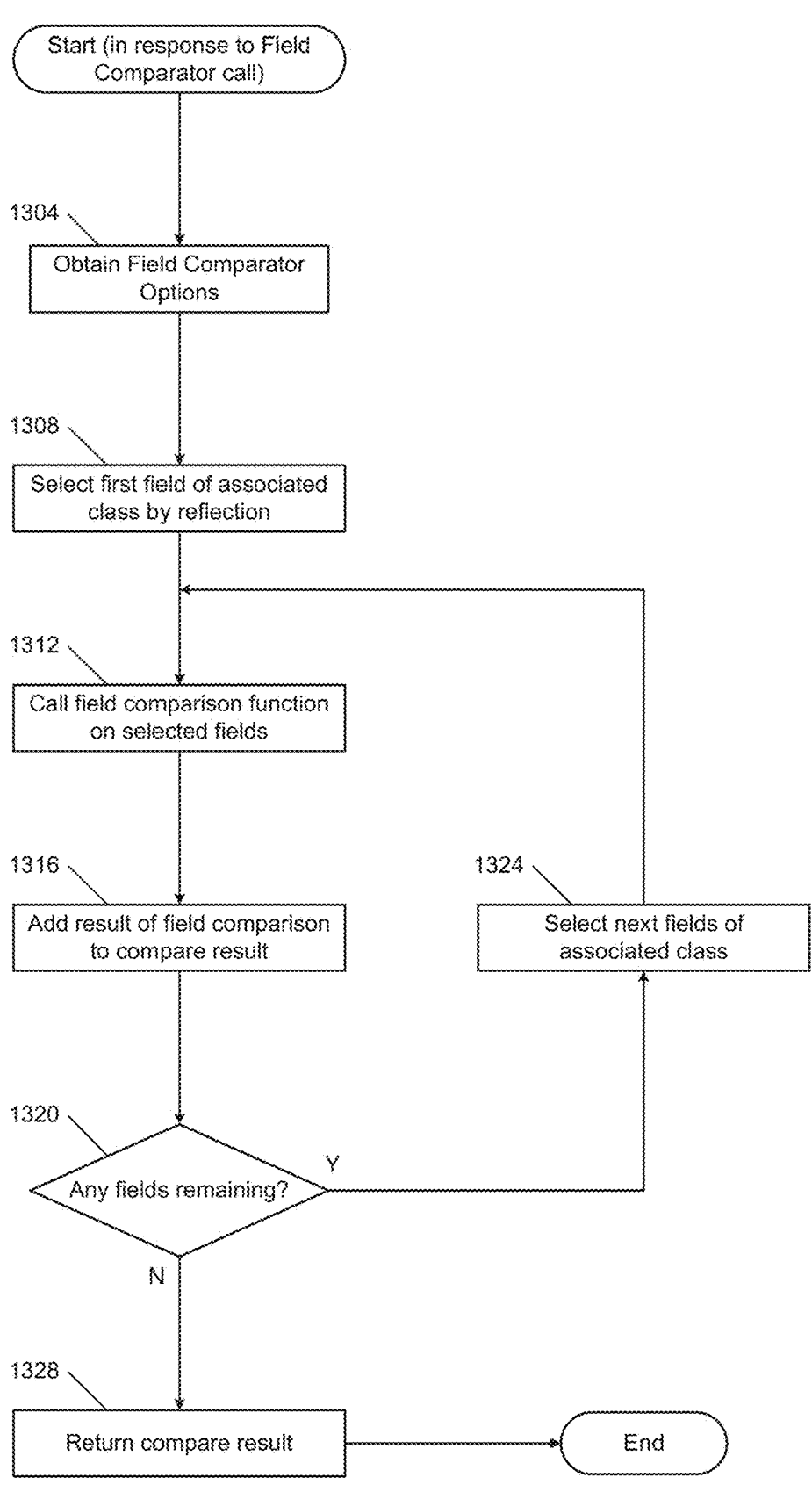

FIG. 13 is a flowchart depicting an example process for executing a field comparison in the process of FIGS. 7A and 7B.

Figure 14:
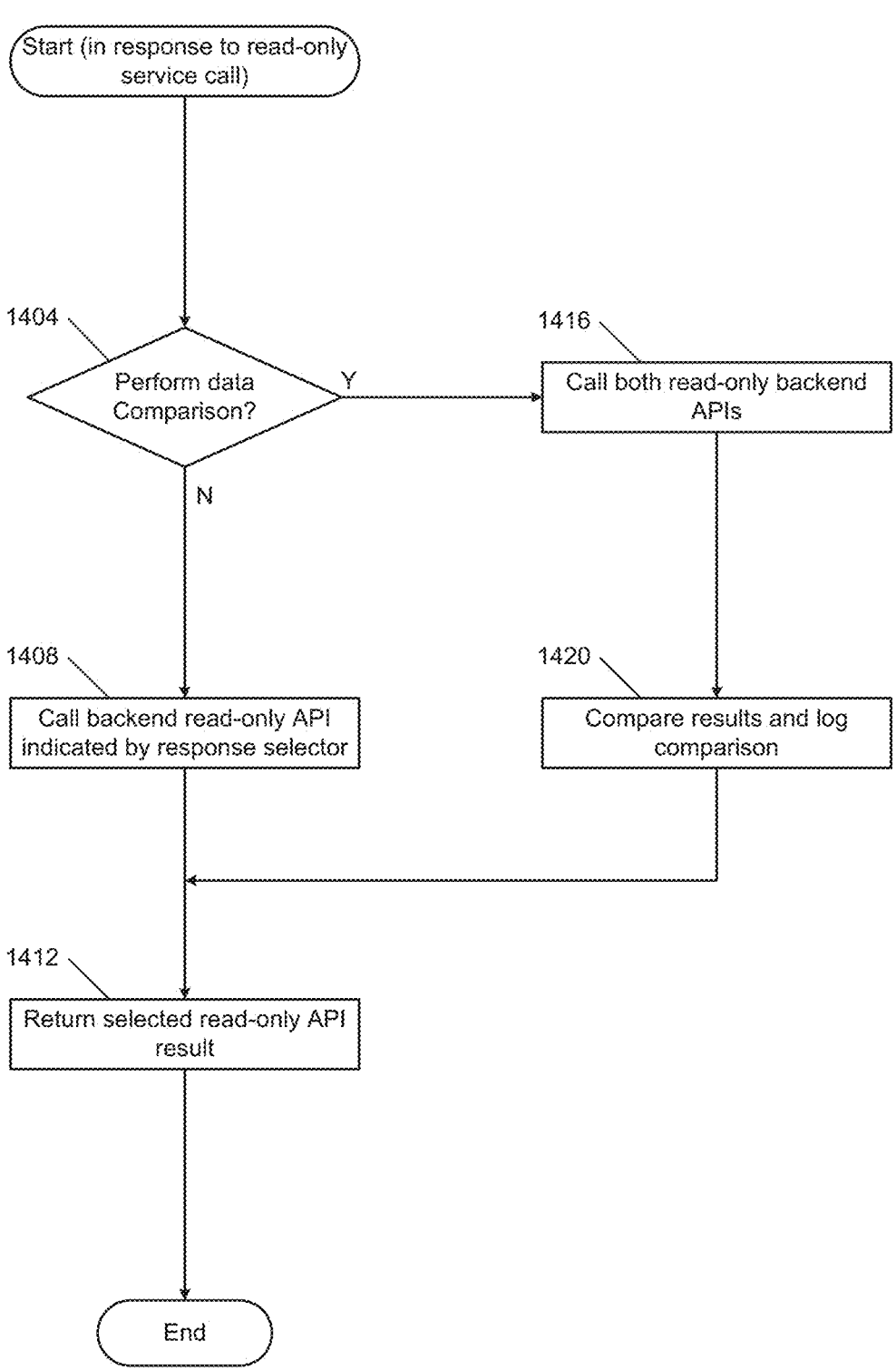

FIG. 14 is a flowchart depicting an example process for executing a read-only service call.

Figure 15:
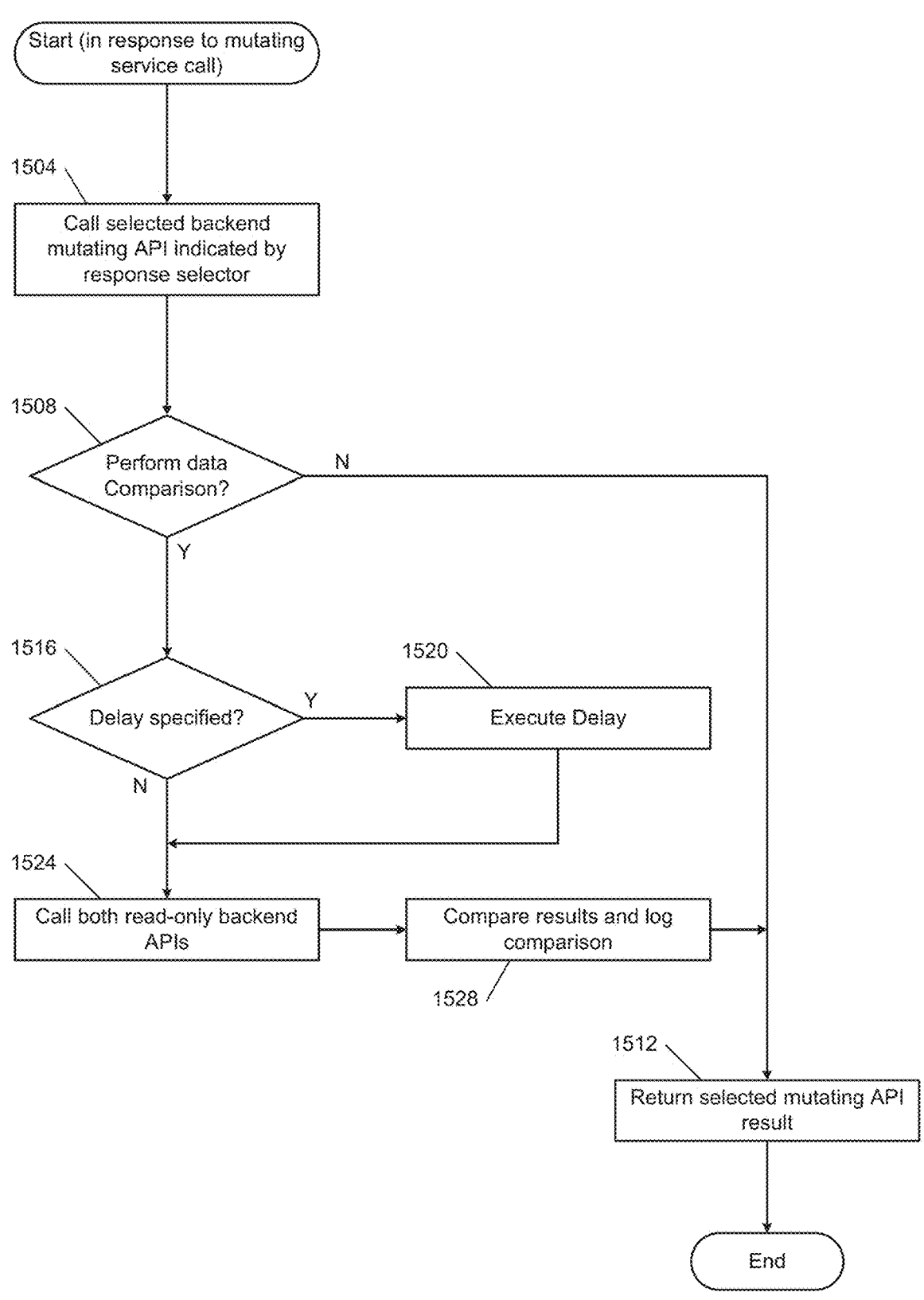

FIG. 15 is a flowchart depicting an example process for executing a mutating service call.

In the drawings, reference numbers may be reused to identify similar and/or identical elements.

DETAILED DESCRIPTION

High-Volume Pharmacy

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug is successfully adjudicated. The aforementioned adjudication operations generally occur before the copayment is received and the prescription drug is dispensed. However, in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally, or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container.

The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Risk Mitigation Architecture for Service Adoption

In some example embodiments described herein, a generic service adoption framework in implemented as a shared library that can be easily used by any service adoptions. A generic comparison tool for data certification of any new API may be implemented with just configurations, and without specific coding needs.

Feature flags may be used to control a percentage of data certification, as well as service adoption, and the system may provide a transaction result comparison. For example, data configuration may drive a generic data comparison tool, including abstraction of the feature flag control logic and abstraction of multi-thread handling of calling both old and new APIs, data comparison, and transaction verification. In some example embodiments, the feature selector used for data comparison may start with a small percentage (e.g., zero percent) and increase over time up to a specified value (e.g., up to 100%). The feature selector which chooses which API result to supply to the consumer (legacy API result or new API result), may start from a small percentage such as zero, and increase over time up to a specified value, such as 100% (e.g., full adoption). In various implementations, the adoption feature selector may only start increasing from zero after the comparison feature selector has reached its peak specified value (e.g., 100%).

FIG. 4 is a functional block diagram of an example system 400 for new application programming interface service adoption. As shown in FIG. 4, a legacy response module 402 is configured to implement old service APIs (e.g., existing, current, or legacy APIs), and a new service response module 404 is configured to implement new service APIs (e.g., new service APIs that the system 400 intends to adopt for data requests from the client interface 412).

While the system 400 is generally described as being deployed in a computer network system, the legacy response module 402, the new service response module 404, the data certification module 408, the client interface 412, the selectors 406, and/or components of the system 400 may otherwise be deployed (for example, as a standalone computer setup). The system 400 may include one or more suitable computing devices, such as computer servers.

As shown in FIG. 4, the legacy response module 402, the new service response module 404, the data certification module 408 and the selectors 406 may include, for example, software applications running on web servers, such as a physical server or virtual machine in a data center. The legacy response module 402, the new service response module 404, the data certification module 408 and the selectors 406 may access data stored in one or more databases, such as different physical memories within web servers or virtual machines (e.g., different random access memory (RAM), read-only memory (ROM), a non-volatile hard disk or flash memory, etc.). In some implementations, the legacy response module 402, the new service response module 404, the data certification module 408 and the selectors 406 may access the same memory (such as in different address ranges of the same memory). In various implementations, legacy response module 402, the new service response module 404, the data certification module 408 and the selectors 406 may access structured or unstructured data in any suitable type of data store.

In various implementations, users (or software data systems) may interact with the legacy response module 402 and the new service response module 404, via a consuming application 411. The consuming application 411 may include any suitable software applications and/or user device for displaying text and receiving input from a user, transmitting and receiving data over the network 410, etc., including a desktop computer, a laptop computer, a tablet, a smartphone, a server, etc. In various implementations, the consuming application 411 may access a client interface 412 through one or more networks 410, and the client interface 412 may access the legacy response module 402 and the new service response module 404. Example networks may include a wireless network, a local area network (LAN), the Internet, a cellular network, etc.

The system 400 may provide risk mitigation through controlled adoption, such as controlling the transition from servicing the client interface 412 via the legacy response module 402 to servicing the client interface 412 via the new service response module 404. This may allow for testing of APIs of the new service response module 404 in production with more data available.

A data certification module 408 may be used to discover gaps via data certification. For example, as described further below, the data certification module 408 may be configured to compare results, outputs, etc. of service API calls from the legacy response module 402 and the new service response module 404.

The selectors 406 may be configured to control an amount of data certification and service adoption in real time, such as based on feature flag settings, etc. For example, the selectors 406 may be configured to control an amount of results from the legacy response module 402 and the new service response module 404 that are sent to the data certification module 408, such as thirty percent of results, fifty percent of results, seventy percent of results, etc.

Similarly, the selectors 406 may be configured to control adoption of new service APIs by controlling an amount of results from the new service response module 404 that are sent to the client interface 412 (e.g., instead of results from the legacy response module 402), such as five percent of new service API results, ten percent of new service API results, fifty percent of new service API results, etc.

The feature flags may be adjusted over time, such as by increasing the amount of results from the new service response module 404 that are sent to the client interface 412 over time, to increase adoption of the new service APIs, reducing the amount of results that are sent to the data certification module 408 over time once the new and old service APIs have been sufficiently compared, etc. A shared library may store various components, such as a data certification tool, service adoption, feature flag selector controls, etc.

As described above, data certification is an important component of the service adoption framework in the system 400. The data certification module 408 may be configured to compare and certify that responses from new service APIs are the same as responses from old service APIs.

For example, a new service API may not produce exactly the same response as an old service API, due to requirement changes, etc. Therefore, data comparison may not be a strict field by field comparison. In some cases, the data from the old service API and new service API can have legitimate or allowable differences (e.g., different data fields, different records, etc.). An example old service API response may be:

```
{
  "ignorableField": "111",
  "onlyInOld": "in old",
  "array": [
    {
      "key": "common key"
    }
  ]
}
```

An example new service API response may be:

```
{
  "ignorableField": "222",
  "onlyInNew": "in new",
  "array": [
    {
      "key": "common key",
    },
    {
      "key": "new API only key",
    }
  ]
}
```

In some example embodiments, instead of using specific logic to handle each of these special behaviors, a generic data comparison tool (such as the data certification module 408) may handle these special behaviors on allowed differences, using configurations to define these exceptions.

FIG. 5 is a functional block diagram of an example risk mitigation architecture 500 for new application programming interface service adoption. As shown in FIG. 5, an API 502 is connected with a delegation module 508 via a service 504.

The delegation module 508 receives old service API call responses from the legacy backend 516 via a legacy adapter 514, and receives new service API call responses from a new API backend 520 via a new API adapter 518. For example, a common API 502 and data model (e.g., the service 504) may be defined to encapsulate both the legacy backend 516 and the new API backend 520.

The legacy backend API and model may be wrapped into an adapter class (e.g., the legacy adapter 514) to expose a common API. Similarly, a new adapter (e.g., the new API adapter 518) may be built to expose the new backend API to the common API.

The delegation module 508 includes a delegate class for API calls that exposes the common API (e.g., the common API exposed by the legacy adapter 514 and the new API adapter 518). The delegation module 508 may receive one or more feature selectors 512 for data comparison, which may determine which backend API response is returned to the API 502 via the service 504 (e.g., in the common data domain).

For example, a common API and data model may generalize the two backend APIs and their requests/responses. Adapter classes that implement the common API are configured to call the backend APIs, and map requests/responses between the backend and common data domains.

The delegate class (of the delegation module 508) implements the common API, coordinates backend API calls, and handles call responses. A data comparator module 510 reports response differences. The feature selectors 512 may drive which backend APIs the delegation module 508 calls (e.g., from the legacy backend 516 or the new API backend 520), and whether the delegation module 508 compares responses via the data comparator module 510. The architecture 500 may include one or more logging components for logging results of comparisons, logging responses from the legacy and new service APIs, etc.

In some example embodiments, feature selectors are supplied when a delegate is constructed. The delegation module 508 may query the feature selectors 512 each time a delegated method is called (e.g., the API 502 requests a response via the service 504). Delegate behavior for a given call may be directed by feature selector responses. In various implementations, the selection criteria are consumer-defined. They feature selection criteria may be static, or dynamically driven (e.g., by LaunchDarkly feature flags driven by unique user identifiers).

As an example, a data comparison selector may include a function that determines whether the delegation module 508 should call both backend APIs, compare the results, and report differences. The example component below defines a selector that returns a Boolean value (true or false). That value is determined by querying a helper bean (LaunchDarklyHelper) as to whether the current user is in the population defined for the given LaunchDarkly flag:

```
        @Bean
    public BooleanSupplier accountDataComparisonSelector(
        @Value("${com.example.feature.account.compare}") String
    compareResponsesFeatureFlag,
        LaunchDarklyHelper launchDarklyHelper) {
        return ( ) ->
```

-continued

```
        launchDarklyHelper.getBoolean(compareResponsesFeatureFlag);
    }
```

As another example, the response selector is a function that determines which backend call response the delegation module 508 should return to the caller. The example component below defines a selector that returns an enumerated value (ApiDelegate.ApiSelection.PRIMARY or ApiDelegate.ApiSelection.SECONDARY). Like the data comparison selector, this function queries a LaunchDarkly flag using a LaunchDarklyHelper to select which response is returned:

```
        @Bean
    public Supplier<ApiDelegate.ApiSelection> accountApiSelector(
        @Value("${com.example.feature.account.useEntity}") String
    useEntityFeatureFlag,
        LaunchDarklyHelper launchDarklyHelper) {
        return ( ) -> launchDarklyHelper.getBoolean(useEntityFeatureFlag) ?
            ApiDelegate.ApiSelection.SECONDARY :
            ApiDelegate.ApiSelection.PRIMARY;
    }
```

Framework consumers may utilize the supplied delegate to propagate API calls for potential data certification and response selection. This may be implemented by extending the framework delegate and providing requisite adapters, feature selectors, and data comparator dependencies:

```
        @Bean
    public AccountAdapterApi accountDelegate(AccountAdapterApi
    legacyAdapter,
            AccountAdapterApi entity Adapter,
            Supplier<ApiDelegate.ApiSelection>
    accountApiSelector,
            BooleanSupplier accountDataComparisonSelector,
            DataComparatorApi dataComparator,
            ComparisonResultLoggerApi comparisonResultLogger,
            Executor executor) {
        return new AccountDelegate(legacyAccountAdapter,
        entityAccountAdapter,
    accountApiSelector,
            accountDataComparisonSelector, dataComparator,
        comparisonResultLogger, executor);
    }
```

An extended delegate may route method calls made to the common API interface. This example delegate implements the getAccountBalance method on the AccountAdapterApi interface. It passes calls to the adapters to the framework delegate's executeReadOnly method:

```
        public class AccountDelegate extends
    ApiDelegate<AccountAdapterApi>
            implements AccountAdapterApi {
        @Override
        public CommonAccountBalance getAccountBalance(Membership
    membership) {
            return executeReadOnly(( ) ->
    legacy Adapter.getAccountBalance(membership),
                ( ) -> entity Adapter.getAccountBalance(membership),
    "getAccountBalance");
        }
        ...
    }
```

The framework delegate may also supports calls to, and data comparison after, backend service endpoints that add, update, or delete states. This implementation may behave like the read-only call, except that one of two mutating backend calls are made before making two read-only calls to compare the state afterwards. An optional delay, to let backend systems synchronize state, may be specified before the read-only calls and potential data comparison:

```
        public class AccountDelegate extends
ApiDelegate<AccountAdapterApi>
            implements AccountAdapterApi {
    private int delay;
    ...
    @Override
    public CommonAccountBalance payBalance(Membership membership,
BigDecimal amount) {
        return executeMutating(( ) ->
        legacyAdapter.payBalance(membership),
            ( ) -> entityAdapter.payBalance(membership), delay,
            ( ) -> legacyAdapter.getAccountBalance(membership),
            ( ) -> entityAdapter.getAccountBalance(membership),
"getAccountBalance");
    }
}
```

In some example embodiments, if the framework encounters an error when calling a backend API and that API response is selected by the response feature selector, the error condition is returned to the consumer (e.g., to the client interface 412 via the API 502). If the responses are compared, the error is indicated as the response for the selected API by the data comparator module 510.

FIG. 6 is a functional block diagram of an example data comparator 600 in a risk mitigation architecture for new application programming interface service adoption. For example, the data comparator 600 may be similar to the data comparator module 510 of FIG. 5.

As shown in FIG. 6, the data comparator module 608 compares service API responses from the legacy response module 602 and the new service response module 604. The responses may be compared according to one or more comparison configurations 612, to produce a comparison result 616.

For example, the data comparator module 608 may be configured to compare response data from the existing API with the new API, where the compare behaviors are controlled by the comparison configurations 612. In some example embodiments, the comparison configurations 612 may indicated a comprehensive comparison, to handle common data transfer object (DTO) data types. Examples may include, but are not limited to, primitives, strings, classes, collections (such as lists and maps), etc.

In some example embodiments, the comparison configurations 612 may be configured for special needs comparisons, such as whether specified differences in the response data are acceptable, modifying the type of comparisons that will be performed, configurations that are non-intrusive for data models that are being compared, etc. The data comparator module 608 may be configured to report data comparison results (such as by logging in a database, sending to another computing device, displaying on a screen, etc.), in order to more clearly identify differences between API responses.

In some example embodiments, the data comparator module 608 may be configured to use the comparison configurations 612 to control any special comparison behaviors beyond strict equality comparison. For example, the comparison configurations 612 may define data models and keys to identify the data structure, may indicate ignoring specified fields, may indicate ignoring specified difference in value (e.g., null/empty/case insensitive/zero), may indicate ignoring extra records in collections, may indicate ignoring order in lists, may indicate ignoring specified exceptions, etc. The JSON structure for a comparison configuration is:

```
                        [
    {
        "node": node identifiers: class name, or ROOT
        "keys": representative key fields of classes
        "fieldConfigs": [
            {
                "fields": list of field names to have the following compare
                option
                "ignore": list of ignore conditions, examples: field, case,
                order, exception
            }
        ]
    }
]
```

An example data comparison JSON structure is:

```
[
    {
        "node": "ROOT",
        "fieldConfigs": [
            {
                "fields": "getPaymentMethods,getAddresses",
                "ignore": "order"
            }
        ]
    },
    {
        "node": "com.esrx.mobile.model.Prescription",
        "keys": "rxNumber",
        "fieldConfigs": [
            {
                "fields": "consentRequired,refillsRemaining",
                "ignore": "field"
            },
            {
                "fields": "pharmacyName",
                "ignore": "case"
            }
        ]
    }
]
```

Risk Mitigation Process for New API Service Adoption

FIGS. 7A and 7B are a flowchart depicting top level data comparison logic. The process of the following figures may be carried out by, for example, one or more processors of the system 400 of FIG. 4, the architecture 500 of FIG. 5, or the data comparator 600 of FIG. 6.

The process of FIG. 7A starts in response to, for example, an object comparison request, such as a request for the data comparator 600 to compare objects of API responses from a legacy service API and a new service API. At 702, control determines whether the first object or the second object is an exception. If so, control proceeds to 704 to call an exception comparison function. The exception comparison function is described further below with reference to FIG. 8. Control then returns the comparison request result at 728.

If neither object is an exception at 702, control proceeds to 706 to determine whether the first object or the second object is a null object. If so, control sets the compare result to 'same' at 708. Control then returns the comparison request result at 728.

If neither object is a null object at 706, control proceeds to 712 to obtain class information for the objects. Control then determines at 713 whether the class is a primitive. If so, control proceeds to 716 to call a primitive comparator function. The primitive comparator function is described further below with reference to FIG. 9. Control then returns the comparison request result at 728.

If the class is not primitive at 714, control proceeds to 718 to determine whether the class is string. If so, control calls the string comparator function at 720. The string comparator function is described further below with reference to FIG. 10. Control then returns the comparison request result at 728.

If control determines at 718 that the class is not string, control performs a field by field object comparison at 722. If the comparison result is known at 724 (e.g., of the field by field comparison), control sets the compare result to same or different based on the field by field objects comparison at 726. Control then returns the comparison request result at 728.

If the field by field comparison result is unknown at 724, control proceeds to 730 to determine whether the class is map, as shown in FIG. 7B. If the class is map, control proceeds to 732 to call a map comparator function. The map comparator function is described further below wither reference to FIG. 11. Control then returns the comparison request result at 728.

If the class is not map at 730, control determines whether the class is a list at 734. If so, control calls the list comparator function at 736. An example list comparator function is described further below with reference to FIG. 12. Control then returns the comparison request result at 728.

If the class is not list at 734, control compares object keys at 738. If the compare result of the object key comparison is the same or unknown at 740, control calls the field comparison function at FIG. 13. The field comparison function is described further below with reference to FIG. 13. Control then returns the comparison request result at 728.

If the compare result of the object keys is different at 740, control proceeds to 744 to set the compare result to different based on the object keys comparison. Control then returns the comparison request result at 728.

FIG. 8 is a flowchart depicting an example process for executing an exception comparison in the process of FIGS. 7A and 7B. The process of FIG. 8 may start in response to an exception comparator call, such as the exception comparator call at 704 in FIG. 7A.

At 804, control obtains exception comparator options. The exception comparator options may define how the data comparator should handle comparison of exceptions for different objects. At 808, control determines whether the setting 'ignore such exception' is set as true. If so, control proceeds to 812 to set the compare result to same (e.g., because the comparator options have been set to ignore the specific exception difference between two objects).

If control determines at 808 that the 'ignore such exception' setting has not been set to true, control proceeds to 816 to set the compare result as unknown (e.g., because the exception should not be ignored and there is an exception difference between the objects of the two API responses). Control then returns the compare result at 820.

FIG. 9 is a flowchart depicting an example process for executing a primitive comparison in the process of FIGS. 7A and 7B. The process of FIG. 9 may start in response to the primitive comparator call at 716 in FIG. 7A.

At 904, control obtains primitive comparator options. The primitive comparator options may define how the data comparator should handle comparison of primitives for different objects. At 908, control determines whether the setting 'ignore zero' is set as true. If so, control proceeds to 912 to set the compare result to same (e.g., because the comparator options have been set to ignore a zero primitive difference between two objects).

If control determines at 908 that the 'ignore zero' setting has not been set to true, control proceeds to 916 to compare object primitive values. At 920, control sets compare results according to the primitive value comparison. Control then returns the compare result at 924.

FIG. 10 is a flowchart depicting an example process for executing a string comparison in the process of FIGS. 7A and 7B. The process of FIG. 10 may start in response to the string comparator call at 720 in FIG. 7A.

At 1004, control obtains string comparator options. The string comparator options may define how the data comparator should handle comparison of string for different objects. At 1008, control determines whether the setting 'ignore configured differences' is set as true. If so, control proceeds to 1012 to set the compare result to same (e.g., because the comparator options have been set to ignore a specific string differences between two objects).

If control determines at 1008 that the 'ignore configured differences' setting has not been set to true, control proceeds to 1016 to compare object string values. At 1020, control sets compare results according to the string value comparison. Control then returns the compare result at 1024.

FIG. 11 is a flowchart depicting an example process for executing a map comparison in the process of FIGS. 7A and 7B. The process of FIG. 11 may start in response to a map comparator call, such as the map comparator call at 732 in FIG. 7A.

At 1104, control obtains map comparator options, which may specify how the data comparator should treat differences between map features of the objects of two service API responses being compared. At 1108, control merges keys from the object 1 map and the object 2 map.

Control then selects a first key form the merged keys at 1112. Control obtains a value 1 and a value 2 from the map 1 and the map 2, for the selected key, at 1116. Control then calls a comparison function on value 1 and value 2 at 1120.

At 1124, control adds the function result value to the comparison result. For example, control may obtain a result of the comparison of value 1 and value 2 at 1120, and add the function result to an overall comparison result value. At 1128, control determines whether any merged keys are remaining.

If there are merged keys remaining at 1128, control proceeds to 1132 to select a next key from the merged key list, and returns to 1116 to obtain value 1 and value 2 from map 1 and map 2 according to the next selected key. If control determines at 1128 that no merged keys remain, control proceeds to 1136 to return a comparison result.

FIGS. 12A and 12B are a flowchart depicting an example process for executing a list comparison in the process of FIGS. 7A and 7B. The process of FIGS. 12A and 12B may start in response to a list comparator call, such as the list comparator call at 736 in FIG. 7A.

At 1204, control obtains list comparator options, which may specify how the data comparator should treat differences between list features of the objects of two service API responses being compared. At 1208, control determines whether the setting 'ignore order' is true, indicative of whether an order in the list should be followed.

If 'ignore order' is not set to true, control proceeds to 1212 to select the first item in the smallest list. Control then obtains item 1 and item 2 based on the list index, at 1216. Control calls a compare function on values of the list items at 1220, and adds the result of the item comparison to a compare result at 1224 (e.g., to update an overall comparison result value based on the comparison of two list items).

At 1228, control determines whether any list items are remaining. If so, control proceeds to 1232 to select a next item from the list, and returns to 1216 to obtain item 1 and item 2 based on a list index. Once control determines at 1228 that there are no list items remaining, control proceeds to 1236 to return the compare result.

Returning to 1208, if control determines that the 'ignore order' setting is set to true, control proceeds to 1240 in FIG. 12B to sort list 1 and list 2 based on object keys. Control then selects a first item in each list at 1244, and obtains items and object keys from list 1 and list 2 at 1248.

At 1252, control determines whether the object keys are the same. If not, control sets the item result as different at 1256, and then reports the item with the smaller key as extra at 1260, and advances the list with the smaller key item.

If control determines at 1252 that the object keys are the same, control calls a compare function on values of the list items at 1264. Control then advances both lists at 1268, and adds a result of the item comparison to the original results at 1272.

At 1276, control determines whether any list items are remaining. If so, control selects at next item from the list at 1280, and returns to 1248 to obtain items and object keys from list 1 and list 2. Once control determines that no list items remain at 1276, control returns a compare result at 1284.

FIG. 13 is a flowchart depicting an example process for executing a field comparison in the process of FIGS. 7A and 7B. The process of FIG. 13 may start in response to a field comparator call, such as the field comparator call at 742 in FIG. 7A.

At 1304, control obtains field comparator options, which may be indicative of how the data comparator should handle or ignore differences between fields of response data from two APIs. At 1308, control selects a first field of an associated class, which may be implemented with reflection.

At 1312, control calls the field comparison function on the selected fields. At 1316, control adds a result of the field comparison to the compare result. Control then determines at 1320 whether there are any list fields remaining (e.g., any fields of the associated class).

If there are fields reaming at 1320, control selects next fields of the associated class at 1324, and then returns to 1312 to call a field comparison function on the selected fields. Once control determines at 1320 that there are not any list items remaining, control returns the compare result.

FIG. 14 is a flowchart depicting an example process for executing a read-only service call. For example, a framework delegate may support two operations, one for read-only service API calls, and one for mutating calls with follow-up read-only calls. Both flows may support optional data comparison and API selection using feature selectors.

At 1404, control determines whether a data comparison will be performed. If so, control calls both read-only backend APIs at 1416. Control then compares the results of the read-only backend APIs at 1420, and logs the comparison. At 1412, control returns a selected read-only API result.

If control determines at 1404 that a data comparison will not be performed, control proceeds to 1408 to call a backend read-only API indicated by a response selector. Control then returns the selected read-only API result at 1412.

FIG. 15 is a flowchart depicting an example process for executing a mutating service call. At 1504, control calls a selected backend mutating API indicated by a response selector. At 1508, control determines whether a data comparison will be performed. If not, control returns a selected mutating API result at 1512.

If control determines at 1508 that a data comparison will be performed, control proceeds to 1516 to determine whether a delay has been specified. If a delay has been specified at 1516, control executes the delay at 1520, before calling both read-only backend APIs at 1524.

If control determines at 1516 that a delay has not been specified, control proceeds to 1524 to call both read-only backend APIs without executing a delay. Control then compares results and logs the comparison at 1528, and returns a selected mutating API result at 1512.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A risk mitigation architecture for new application programming interface service adoption, the risk mitigation architecture comprising:

a client interface configured to generate an application programming interface (API) call;

a legacy API module configured to generate a legacy API result in response to receiving the API call;

a new API module configured to generate a new API result in response to receiving the API call;

a delegation module in communication between the client interface, the legacy API module and the new API module, the delegation module configured to selectively return the legacy API result to the client interface or the new API result to the client interface, according to at least one specified feature selector; and a data comparator in communication with the delegation module, the data comparator configured to compare the legacy API result with the new API result according to at least one specified comparison configuration, to generate an API comparison result indicative of the legacy API result and the new API result having same output data or different output data.

2. The risk mitigation architecture of claim 1, further comprising:

a legacy API adapter class in communication between the delegation module and the legacy API module, the legacy API adapter class configured to wrap a backend API and data model of the legacy API module to expose a common API to the delegation module for the legacy API module; and a new API adapter class in communication between the delegation module and the new API module, the new API adapter class configured to wrap a backend API and data model of the new API module to expose a common API to the delegation module for the new API module.

3. The risk mitigation architecture of claim 1, wherein:

the at least one specified feature selector includes a first feature selector, and a second feature selector; and the delegation module is configured to selectively transmit a first feature selector percentage of legacy API results and new API results to the data comparator in order to compare the legacy API results and the new API results.

4. The risk mitigation architecture of claim 3, wherein the delegation module is configured to select a second feature selector percentage of the new API results to return to the client interface instead of the legacy API results.

5. The risk mitigation architecture of claim 4, wherein:

the delegation module is configured to use zero as an initial setting for the second feature selector percentage; and the delegation module is configured to increase the second feature selector percentage subsequent to the initial setting of zero.

6. The risk mitigation architecture of claim 4, wherein:

the delegation module is configured to use zero as an initial setting for the first feature selector percentage; and the delegation module is configured to increase the first feature selector percentage subsequent to the initial setting of zero.

7. The risk mitigation architecture of claim 1, wherein the specified comparison configuration includes at least one of an exception data comparison between the legacy API result with the new API result, a primitive data comparison between the legacy API result with the new API result, a string data comparison between the legacy API result with the new API result, a map data comparison between the legacy API result with the new API result, a list data comparison between the legacy API result with the new API result, and a field data comparison between the legacy API result with the new API result.

8. The risk mitigation architecture of claim 1, wherein the data comparator is configured to call an exception comparator function in response to a determination that an object of the legacy API result or the new API result includes an exception.

9. The risk mitigation architecture of claim 1, wherein the data comparator is configured to:

obtain class information of at least one object of the legacy API result or the new API result;

call a primitive comparator function in response to a determination that a class of the legacy API result or the new API result is a primitive; and call a string comparator function in response to a determination that a class of the legacy API result or the new API result is a string.

10. The risk mitigation architecture of claim 1, wherein the data comparator is configured to:

perform a field by field comparison of fields of the legacy API result and the new API result;

call a map comparator function in response to a determination that a class of the legacy API result or the new API result is a map; and call a list comparator function in response to a determination that a class of the legacy API result or the new API result is a list.

11. The risk mitigation architecture of claim 1, wherein the data comparator is configured to:

compare object keys of the legacy API result and the new API result; and call a field comparator function in response to a result of the comparison of the object keys.

12. A method of risk mitigation for new application programming interface service adoption, the method comprising:

generating, by a client interface, an application programming interface (API) call;

generating, by a legacy API module, a legacy API result in response to receiving the API call;

generating, by a new API module, a new API result in response to receiving the API call;

selectively returning, by a delegation module, the legacy API result to the client interface or the new API result to the client interface, according to at least one specified feature selector, the delegation module in communication between the client interface, the legacy API module and the new API module; and comparing, by a data comparator, the legacy API result with the new API result according to at least one specified comparison configuration, to generate an API comparison result indicative of the legacy API result and the new API result having same output data or different output data, the data comparator in communication with the delegation module.

13. The method of claim 12, further comprising:

wrapping, by a legacy API adapter class, a backend API and data model of the legacy API module to expose a common API to the delegation module for the legacy API module, the legacy API adapter class in communication between the delegation module and the legacy API module; and wrapping, by a new API adapter class, a backend API and data model of the new API module to expose a common API to the delegation module for the new API module, the new API adapter class in communication between the delegation module and the new API module.

14. The method of claim 12, wherein:

the at least one specified feature selector includes a first feature selector, and a second feature selector; and the method further comprises selectively transmitting, by the delegation module, a first feature selector percentage of legacy API results and new API results to the data comparator in order to compare the legacy API results and the new API results.

15. The method of claim 14, further comprising selecting, by the delegation module, a second feature selector percentage of the new API results to return to the client interface instead of the legacy API results.

16. The method of claim 12, wherein the specified comparison configuration includes at least one of an exception data comparison between the legacy API result with the new API result, a primitive data comparison between the legacy API result with the new API result, a string data comparison between the legacy API result with the new API result, a map data comparison between the legacy API result with the new API result, a list data comparison between the legacy API result with the new API result, and a field data comparison between the legacy API result with the new API result.

17. The method of claim 12, further comprising calling, by the data comparator, an exception comparator function in response to a determination that an object of the legacy API result or the new API result includes an exception.

18. The method of claim 12, further comprising:

obtaining class information of at least one object of the legacy API result or the new API result;

calling a primitive comparator function in response to a determination that a class of the legacy API result or the new API result is a primitive; and calling a string comparator function in response to a determination that a class of the legacy API result or the new API result is a string.

19. The method of claim 12, further comprising:

performing a field by field comparison of fields of the legacy API result and the new API result;

calling a map comparator function in response to a determination that a class of the legacy API result or the new API result is a map; and calling a list comparator function in response to a determination that a class of the legacy API result or the new API result is a list.

20. The method of claim 12, further comprising:

comparing object keys of the legacy API result and the new API result; and calling a field comparator function in response to a result of the comparison of the object keys.

\*    \*    \*    \*    \*